April 1, 1969     H. R. BILLETER     3,435,923

BRAKING ARRANGEMENT FOR RAILWAY HOPPER CARS

Filed July 6, 1967

INVENTOR.
HENRY R. BILLETER
BY
PARKER & CARTER
ATTORNEYS

INVENTOR.
Henry R. Billeter

BY

PARKER & CARTER
ATTORNEYS

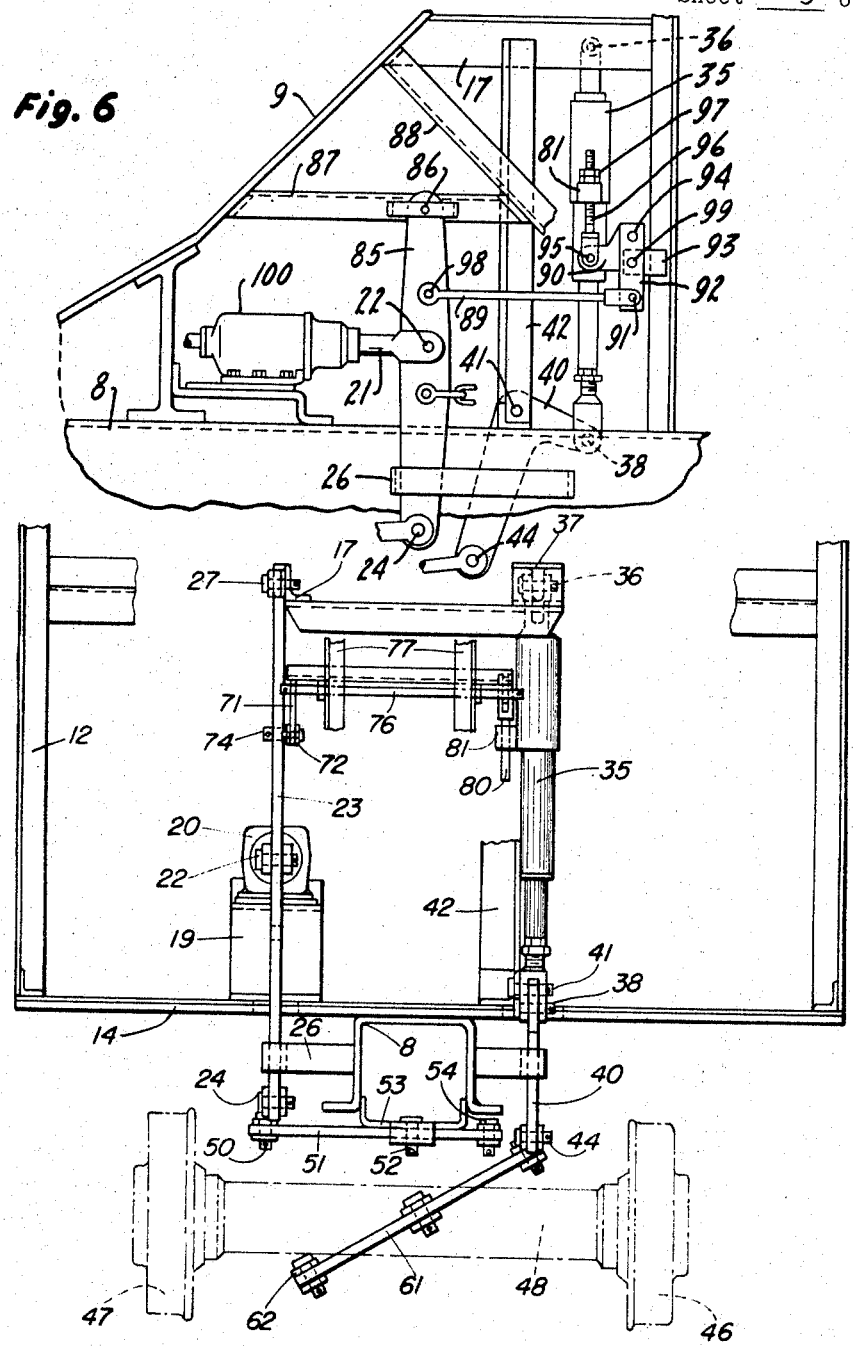

United States Patent Office 3,435,923
Patented Apr. 1, 1969

3,435,923
BRAKING ARRANGEMENT FOR RAILWAY HOPPER CARS
Henry R. Billeter, Deerfield, Ill., assignor to Sloan Valve Company, Chicago, Ill., a corporation of Illinois
Filed July 6, 1967, Ser. No. 651,439
Int. Cl. F16d 65/52; B61h 13/00
U.S. Cl. 188—197                         14 Claims

ABSTRACT OF THE DISCLOSURE

A hopper car with a separate slack adjuster and brake cylinder arranged on each end of the car, the slack adjuster being pivoted perpendicularly on the car frame and to the brake cylinder. The brake linkage extends from a vertical cylinder lever on one side of the truck and brakes, to the other side of the truck, to the slack adjuster. The full braking force is exerted upon the brakes, from one end of the linkage, and the slack adjuster controls for abnormal slack conditions at the other end of the linkage. A trigger connection extends between the cylinder lever and slack adjuster for controlling the latter.

Cross reference to related application

This application is in the nature of an improvement upon applicant's prior Patent No. 3,324,977, issued June 13, 1967.

Description of the prior art

In the well known hopper type of railroad car, the brake controlling equipment including the brake cylinder, control valves, and various connecting parts are all supported and arranged in the usual manner at only one end and below the end sloped wall of the car. This necessitates the use of long connecting rods and linkage extending beneath the center sill structure of the car from one end to the opposite truck end for control of the brakes at that end. This arrangement often rendered it difficult and unsuitable to provide and install automatic slack adjusters. Furthermore, the aforesaid braking equipment, linkage, and tie rods were exposed at all times to weather conditions. Fire for thawing out frozen contents, flying stones, and dust tend to damage and clog the parts, render it difficult to install, service and properly maintain the equipment. The present trend in hopper cars is to extend their length considerably and this tends to aggravate the problems encountered.

Summary of the invention

In accordance with the present invention, entirely separate and individual sets of braking equipment are arranged at each end of a hopper car, which equipment is associated with and controls the brakes on only that end of the car, thereby eliminating the excessively long rods and reducing the numerous levers and brake rigging required along the full length of the car. A reduction of the possibility of damage to the linkage and elimination of sagging and looseness of the rods and linkage is thereby achieved. A substantial reduction in weight and less friction load on the brake rigging, affecting the braking force, also results, thereby enabling a saving in the amount of braking power needed to operate the brakes so that smaller brake cylinders can be employed having a shorter stroke of the push rod. The improved braking arrangement enables a slack adjuster to be used which is much smaller and shorter in length than conventional slack adjusters and therefore less expensive and lighter in weight. A novel feature of this slack adjuster is that it is pivoted at one end in a vertical position below the sloped wall of the hopper car and swingable about its pivot and adjustable longitudinally to compensate for slack conditions.

The invention contemplates a novel braking arrangement in which the brake cylinder is mounted horizontally on the car frame and has its cylinder lever interconnected with the brake linkage to a set of brake shoes on the wheels on one side of the car truck. A tie rod extends across the truck from the first brake shoe connection to brake shoe linkage on the brake shoes at the opposite side of the car truck. A tie rod on this last link connection is fastened to one arm of a bell-crank, the other arm being pivoted to one end of the slack adjuster. The other end of the slack adjuster is pivotally secured to the car frame in position perpendicular to the horizontally mounted brake cylinder. With this arrangement it will be apparent the brake cylinder is connected directly to one end of the braking arrangement while the slack adjuster is connected at the extreme other end as an anchor. The brake linkage for the brake shoes is thereby tied into the system at an intermediate position between the two devices. The result is that the full braking force is evenly and directly applied to the wheels by the brake cylinder and none is expended on the slack adjuster which controls the slack condition only after the braking force has been applied to the brakes.

The angularity of the push rod, the live and dead levers, and the associated actuating brake lever for the brake shoes on one of the trucks, is relatively constant, and any slight adverse angularity will be manifested on the anchor side at the opposite truck at the slack adjusted where it is ineffective to interfere with the produciton of uniform braking power upon the brakes. Since each set of braking equipment is associated with only one end of the hopper car the movement of the levers, push rod, and linkage is relatively small to produce the necessary braking power required. No adverse angularity is encountered with the present braking arrangement as it remains relatively constant or is greatly reduced.

The invention consists in the various features of construction, operation and combination of parts, as will be more fully pointed out hereinafter in the drawings and claims, in which:

Brief description of the drawings

FIGURE 5 is a right hand end view of FIGURE 3 with certain parts left off; while FIGURE 6 is a view similar to FIGURE 4, but showing a variation of the braking arrangement.

Figure 1:
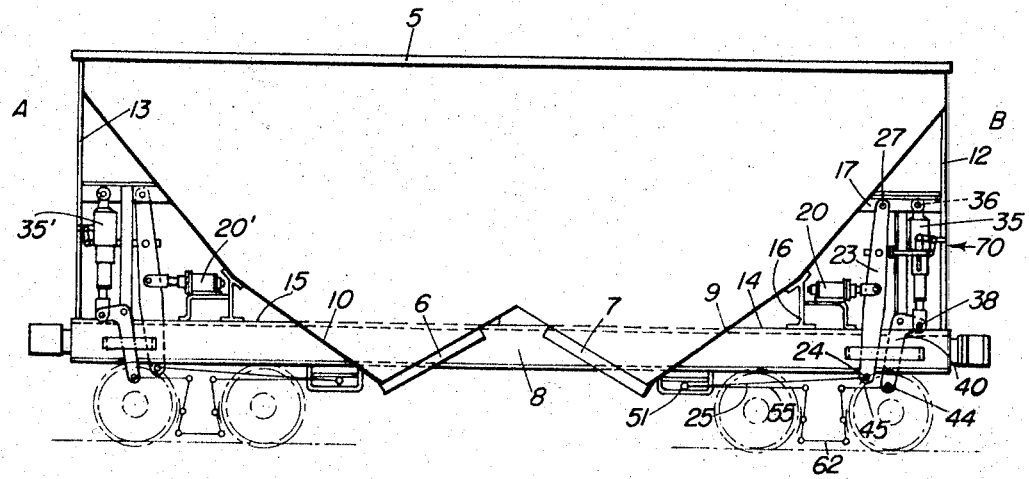
FIGURE 1 is a side view of a hopper type railway car showing the braking equipment of the invention on each end of the car.

In describing the invention only those parts and elements essential to a clear understanding of the same have been illustrated. Other parts actually present in hopper cars, to which the present invention appertains, have either been shown in diagram form or been eliminated as unnecessary for an understanding of the same to those skilled in the art. Mention is made of the usual AB control valve, emergency and auxiliary reservoirs, brake pipeline, etc., all of which in the present instance are located at only one end under the sloped wall of the car, whereas duplicate sets of the braking arrangement of the invention, including the brake cylinder and the slack adjuster, are located at each end of the hopper car and operate entirely independent of one another. For the sake of clarity, some of the supporting brackets and struts have also been left off or indicated only generally.

Description of the preferred embodiment

The invention is illustrated as applied to a conventional type of railway hopper car 5 having the usual hoppers 6 and 7 and the center sill structure 8 extending between the two ends of the car and which is straddled by the hoppers. The sloped walls 9 and 10 on each end of the car are connected to the upright supports 12 and 13 supported in turn on their bottom ends upon the decks 14 and 15 on the under frame of the car and above the center sill 8. The decks 14 and 15 are preferably arranged to more or less close off the bottom of the car at each end of the car to serve as a support for the various elements of the brake control equipment and other parts to protect the same from flying stones, weather conditions and the heat from fires thawing out the frozen contents of the car, when necessary. Suitable struts such as 16 between the sloped wall 9 and deck 14 and other struts 17 between the sloped wall 9 and support 12 are provided for reinforcing and supporting purposes. These and additional struts not shown, may be suitably welded or riveted in place as desired.

In the description which follows the equipment and its operation will be described with reference to only one end of the hopper car, for example the end indicated at B and it will be understood that the opposite end indicated at A is substantially a duplicate thereof and that there are no interconnecting brake controlling rods, levers and such between the two ends of the car, except for an air brake pipe connecting the two brake cylinders not shown.

Figure 4:
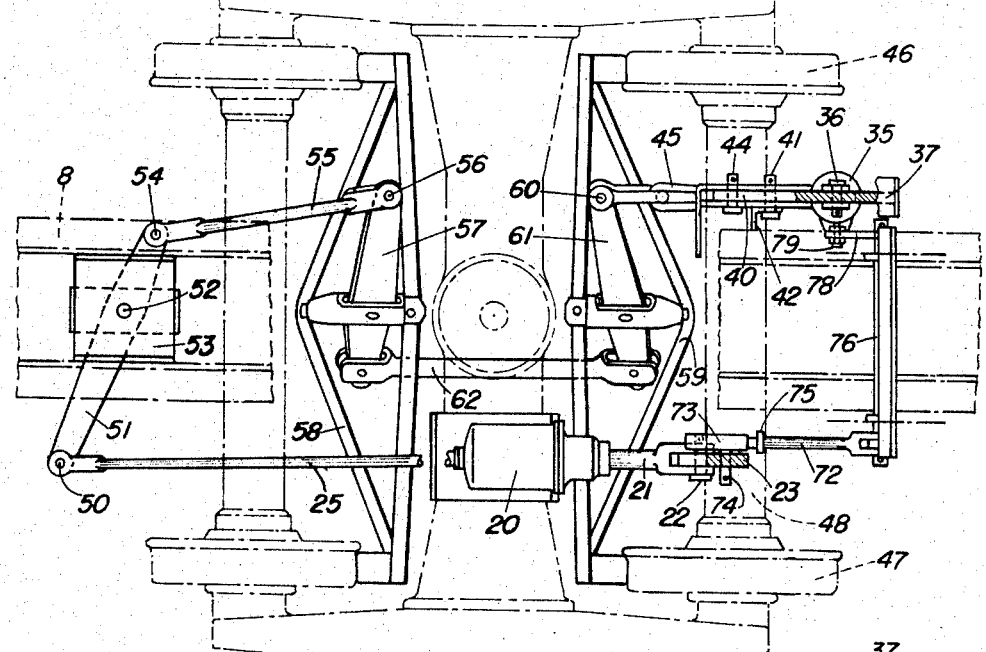
FIGURE 4 is a top view of FIGURE 3.

The brake cylinder 20 is mounted in a horizontal position and bolted to a bracket 19 supported and arranged between the strut 16 and deck 14. The push rod 21 of the brake cylinder extends outward where its clevis is pivoted at 22 to an intermediate point of cylinder lever 23. The lower end of cylinder lever 23 projects downward through an opening in the car deck 14 and at its lower end has a pivoted connection 24 to which the brake tie rod 25 is connected. A guiding bracket 26 on the center sill 8 serves to confine the cylinder lever 23 and helps support it. The extreme upper end of the cylinder lever 23 is pivotally supported at 27 from the supporting horizontal strut 17 so the lever hangs perpendicular to the brake cylinder 20 and is adapted to swing about pivot 27 when actuated by the push rod 21. Both the brake cylinder 20 and the associated cylinder lever 23 are arranged adjacent one side of the center sill 8 and above one set of wheels and the truck as seen in FIGURE 4. A hand brake connection on the cylinder lever 23 is indicated at 30 and extends in the usual manner to the hand wheel (not shown) at the end of the car.

A slack adjuster is provided in the braking arrangement and is preferably of the type in which slack is automatically taken up as wear takes place in the brake shoes and linkage, and automatically lets out slack whenever brake shoes are replaced. One such suitable slack adjuster is of the construction and operation as disclosed in applicant's Patent No. 3,326,335, issued June 20, 1967. In the present instance the slack adjuster indicated at 35 is pivotally supported at 36 at its upper end to the strut 37, so that it hangs perpendicular below the sloped wall 9 of the car frame. It is also arranged substantially parallel to the cylinder lever 23. This vertical arrangement of the slack adjuster is in contradistinction to its usual horizontal position on railroad cars as part of the center rod or other linkage between the live and dead levers of the brake rigging.

The slack adjuster 35 at its lower end is pivoted at 38 to one leg of a bell-crank lever 40 in turn pivoted at 41 to a vertical supporting strut 42 extending between the deck 14 and the strut 37. The other leg 43 of bell-crank 40 has a pivot connection 44 with flexible linkage 45 in turn connected to the brake linkage. As more clearly seen in FIGURES 4 and 5, the slack adjuster 35 is located and arranged on the opposite side of the center sill 8 from the brake cylinder 20 and spaced therefrom between the wheels 46 and 47 and above the axle 48.

The braking linkage for applying the braking force of the brake cylinder 20 to the brake shoes includes the brake rod 25 which at one end is pivotally connected at 24 to the bottom of cylinder lever 23. The other end of rod 25 is pivotally connected at 50 to one end of a dead lever 51 located outboard of the car truck from the brake cylinder 20 and slack adjuster 35. Dead lever 51 is pivoted intermediate its ends at 52 to a bracket 53 welded across the bottom of the center sill 8. The other end of dead lever 51 pivotally connects at 54 with tie rod 55 which in turn is pivotally connected at 56 to the conventional brake actuating lever 57 located on one side of the truck for controlling the brakes on the set of wheels on that side. On the other side of the car truck the flexible link 45 connected to the bellcrank lever 40, is pivotally connected at 60 to one end of actuating lever 61. Both actuating levers 57 and 61 are pivotally connected as usual intermediate their ends to the associated brake beams 58 and 59 carrying the brake shoes. The bottom ends of actuating levers 57 and 61 are pivotally connected together by the cross tie rod 62 extending across the truck bolster and between the two sets of wheels.

Figure 2:
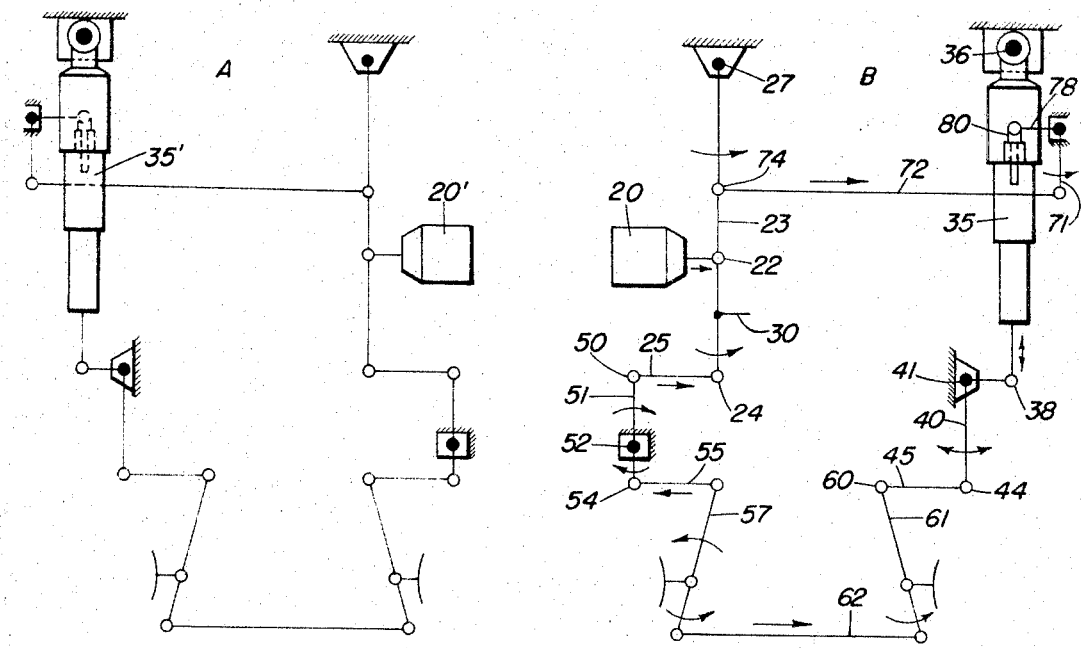
FIGURE 2 is a diagrammatic showing of the brake linkage arrangement at each end of the railway car.

Particular attention is called to the arrangement disclosed wherein the brake cylinder 20 is connected to one extreme end of the brake linkage or rigging while the other end of the linkage is connected to the slack adjuster 35 as clearly depicted in FIGURE 2. This enables full braking power to be applied directly to both sets of brakes while adjustments for slack conditions are made after the full power application. This system accordingly does not deprive the braking effort of power ordinarily wasted or lost by connecting the slack adjuster in an intermediate location in the brake linkage as is customarily done.

The slack adjuster 35 is provided with trigger means for controlling the actuation of the same in correcting for abnormal slack conditions in the brake equipment. This consists of a bell-crank lever arrangement 70 extending between the cylinder lever 23 and the slack adjuster 35, and includes an arm 71 pivotally connected at one end to a rod 72 passing through a sleeve 73 which is pivoted at 74 to the cylinder lever 23. An adjustable stop 75 on rod 72 provides a measure of adjustment for the linkage. The other end of arm 71 is rigidly secured to a long rod or shaft 76 extending across the car sill 8 to the location of the slack adjuster 35. The shaft 76 is supported at each end in vertical brackets 77 suitably attached to the car frame. A second arm 78 is rigidly secured at one end to shaft 76 and is pivotally connected at 79 to an operating push rod 80 passing through a projection 81 formed on the casing of the slack adjuster 35. The foregoing trigger linkage combination 70 is constituted so that any movement of the cylinder lever 23 beyond a certain distance to engage stop 75, causes the trigger arms 71 and 78 to make a partial counterclockwise rotation about their pivots and actuate push rod 80 downward against stop 81. This causes the slack adjuster to function in a manner to compensate for abnormal slack conditions as will be pointed out hereinafter.

The drawings illustrate the equipment in the running position of the car with the brakes released, and in describing the operation of the various elements it is pointed out that the ratios and forces applied are carefully calculated so that the maximum possible braking effort is applied to the brakes with a minimum movement of the elements. Since the braking equipment is associated with only one truck of the hopper car it is not necessary for the push rod 21 to be extended so as to operate within the standard distance of about 8 inches as required by railroad regulations. Therefore in the present instance this push rod stroke can be shortened to at least 4 inches and the brake cylinder 20 consequently shortened and made smaller in capacity without impairing brake efficiency. Furthermore the length of the slack adjuster 35 can be considerably reduced due to its novel support and arrangement with the bell-crank 40 since it compensates for wear at one truck only.

Figure 3:
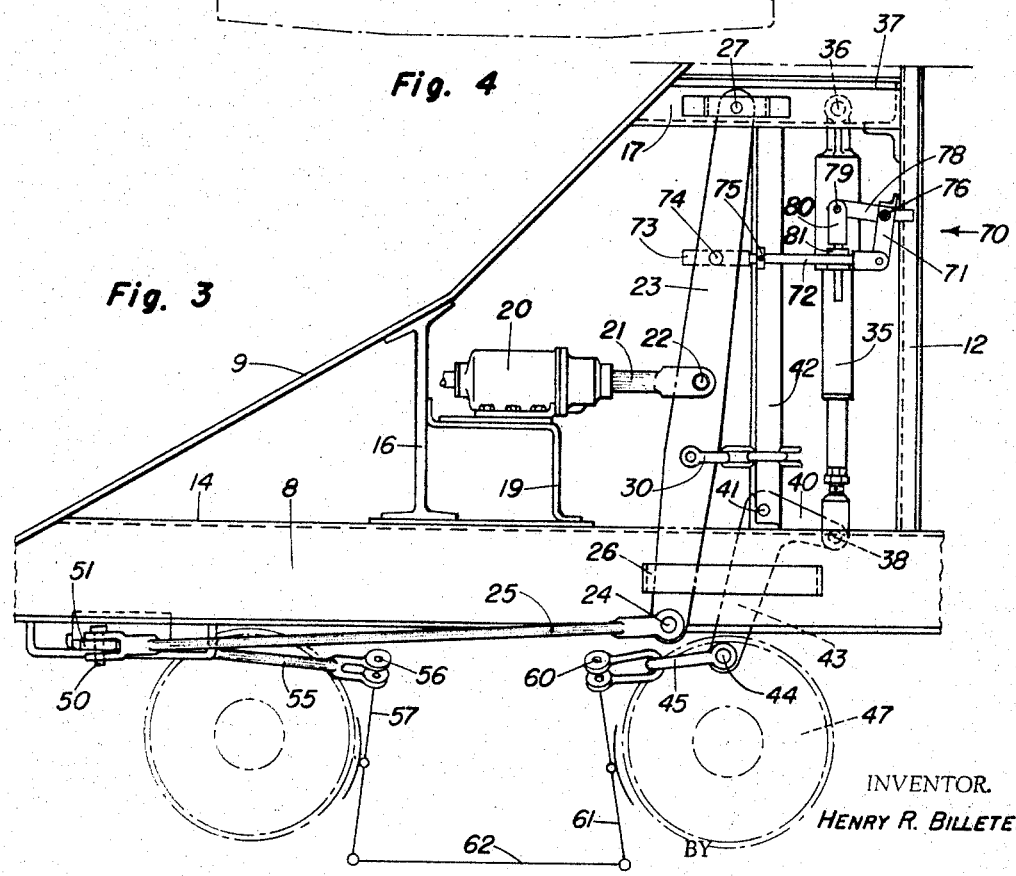
FIGURE 3 is a partial side view showing the braking arrangement at one end of the hopper car.

Assume the railroad car to be in the running position and with the brakes released as shown in FIGURE 3. To produce a braking action air pressure is admitted into the brake cylinder 20 in the usual manner to project the push rod 21 forward. With normal wear assumed on the brake shoes and rigging, the push rod 21 moves cylinder lever 23 outward about its pivot 27 so that the lower end pulls the tie rod 25 and begins to apply the brakes through the connected linkage pointed out. Prior to the attainment of the full stroke of 4 inches of the push rod 21, the cylinder lever 23 moves trigger pivot 74 so that guide sleeve 73 carried by the pivot, engages the stop 75 on rod 72, of the trigger linkage 70. This action results in rotation of levers 71 and 78 about pivot shaft 76 so that push rod 80 bears downward upon stop 81 to shift the slack adjuster mechanism and lock the same as a solid link in the manner pointed out in the aforesaid patent to which reference is made. The lower end of the slack adjuster 35 consequently is held locked against movement as well as the bell-crank 40 and the brake link 45 attached to pivot 44.

As the tension increases in the brake rigging due to further projection of the push rod 21, the brakes are firmly applied through the brake linkage from pull rod 25, dead lever 51, rod 55, actuating lever 57, to the brake beam 58 and finally the brake shoes. The braking force is also extended through the tie rod 62 and across the truck to the actuating lever 61, brake beam 59 and the brake shoes, link 45, and the bell-crank 40 which now is solidly anchored. The full force of the braking power from the brake cylinder 20 is now directly expended upon the brake shoes and none is lost due to any intermediate slack adjuster connection as formerly, the slack adjuster in the present instance serving merely as an anchoring point in the brake linkage.

In the event that new brake shoes have been installed, the action of the brake control equipment is such that slack is automatically let out during brake application. When the brake shoes engage the car wheels this increases tension in the system causing the slack adjuster 35 to lengthen and let out slack before the cylinder lever 23 contacts the trigger stop 75. The bell-crank 40 is thereby rotated clockwise by the pull of the brake linkage. When the push rod 21 has extended to almost its full amount the cylinder lever 23 engages trigger stop 75 to lock the slack adjuster as a solid link in the brake linkage. Upon brake release, the power spring in the slack adjuster, as well as the weight of the braking equipment, restores the elements to running condition. The ratios and the angularity between the slack adjuster, the bell-crank 40, the brake lever 23, and the brake cylinder push rod 21, are such that only a small movement of the slack adjuster is necessary to correct slack condition. It can, therefore, be made much smaller and easily fits in the vertical position at the end of the hopper car as shown.

As the brake shoes become worn and looseness develops in the braking system, the push rod 21 will necessarily be projected beyond its normal limit of travel, thereby indicating an excess of slack. The present slack adjuster is arranged to take up slack upon release of the brakes so that upon the next brake application the push rod stroke will be normal. With the presence of excess slack, the slack adjuster acts as a solid link when tension builds up in the system and the brake shoes engage the car wheels, overcoming the power spring in the slack adjuster. This lock-up occurs when the cylinder lever 23 engages the trigger stop 75 after about 4 inches projection of the push rod 21, causing rotation of the levers 71 and 78 and downward movement of rod 80 to shift the casing of the slack adjuster 35 downward. Upon brake release the power spring in the slack adjuster forces the lower end of the slack adjuster upward shortening the same to take up the excess slack and returning the trigger elements 70 and other parts to normal. Upon the next brake application the brake system will be normal and the push rod effective to operate within its normal stroke of 4 inches to properly apply the brakes.

Referring now to the modification shown in FIGURE 6, this braking arrangement is designed for use of the standard 10 inch brake cylinder for economy sake rather than the samaller size previously pointed out. However, the piston stroke need only be 2⅝ inches for complete brake application and the cylinder lever can therefore be considerably shortened. As a further result the trigger linkage is slightly altered to pull down on the slack adjuster casing instead of pushing down.

The standard 10 inch brake cylinder indicated at 100 has its push rod 21 pivoted at 22 to a shortened cylinder lever 85, in turn pivoted at the top end by pivot pin 86 to a cross member 87 somewhat below the member 17. The cross member 87 is attached at one end to the sloped car wall 9 and at the other end to diagonal brace 88. The trigger mechanism includes the rod 89, pivoted at one end 98 to the cylinder lever 85 and at the other end, at 91 to a pivoted bracket 92 located on one side of the car sill, as shown. Bracket 92 is adapted to rock on the long rod 99 pivoted at each end in the fixed bracket 93. An angular bracket 90 on each end is welded at the top to the rod 94 and at its other end carries pivot 95 attached to threaded rod 96. The other end of rod 96 freely passes through the boss 81 formed on the movable shell of slack adjusted 35. Lock nuts 97 on the rod 96 enable the proper original adjustment of the trigger mechanism to be made.

It will be apparent that when the cylinder lever 86 is actuated the rod 89 rotates the linkage 92 and 90 clockwise about pivot 99 resulting in rod 96 exerting a downward pull on the slack adjuster casing to provide the proper slack adjustment as dictated by the condition of the brake rigging attached to the bottom ends of cylinder 85 and bellcrank 40.

Many important advantages accrue from the present invention. There is a great reduction in the number and length of the brake rods and levers, and only small movements of the operating elements are necessary to accomplish the braking action. There is also a more positive and reliable correction of abnormal slack conditions. In addition, there is the effect of relatively constant angularity of the push rod 21 and associated levers and brake rods on one car truck so the most effective use is made of the full braking power upon the brakes, while any adverse or bad angularity will take place on the anchor side of the truck at the slack adjuster to effect full braking power and since each truck has its individual brake control equipment the movement of the parts are relatively small. Also the failure of one set of brakes will not affect the equipment on the other end of the hopper car. Another advantage gained is that the slack adjuster and the brake cylinder can be made much smaller so that economies in cost are realized, as well as a space and weight saving at the end of the hopper car for better accommodation of the other necessary brake control equipment such as the usual AB control valve, reservoir, brake cylinder release valve, retainer valve, and other elements.

While there has been illustrated and described a preferred embodiment of the invention, it is to be understood that this is capable of many variations and modifications, and it is desired, therefore, not to be limited to the precise details set forth.

It will be understood, for example, that whereas I show my invention in connection with hopper cars, it may, under some conditions, be applicable to cars of other types.

I claim:

1. In a braking arrangement for hopper cars, a separate brake cylinder and an automatic double acting slack adjuster located on each end of the car below the sloped hopper wall thereof, each brake cylinder and each slack adjuster being arranged perpendicular to one another, the top end of said slack adjuster being pivoted adjacent the sloped hopper car wall and its lower end extending downward adjacent the base of the hopper car, a cylinder lever pivoted at its upper end below the sloped hopper car wall and extending generally parallel to said slack adjuster and downward below the base of the hopper car, said brake cylinder being pivotally connected to an intermediate position on said cylinder lever, a bell crank member pivoted to the hopper car frame and having one leg pivoted to the lower end of said slack adjuster and the other leg extending downward below the base of said hopper car, and interconnecting brake linkage means between the lower end of said cylinder lever and the lower end of said bell crank member, said brake linkage means also being connected to the brake shoes for actuation of the brakes by said brake cylinder.

2. In a braking arrangement for railroad cars, a separate brake cylinder and an automatic double acting slack adjuster on each end of the car on a supporting frame thereof, for controlling the brakes on the car wheels on opposite sides of a car truck, said brake cylinder being supported in a horizontal position on the frame of said car and said slack adjuster being pivotally supported at its upper end in a vertical position from the frame of the railroad car, the lower end of said slack adjuster extending downward to the base of said car, a cylinder lever having its upper end pivoted to the frame of said car and its lower end extending downward through the base of said car, said cylinder lever being arranged generally parallel to said slack adjuster, said brake cylinder having its push rod pivotally connected to an intermediate point of said cylinder lever, a bell crank lever pivotally supported on the frame of said car, one leg of said bell crank lever being pivotally connected to the lower end of said slack adjuster and the other leg extending downward through the frame of said car, pivoted brake linkage means connecting the lower end of said cylinder lever with the brake shoes of one set of car wheels on one side of the car truck, other pivoted brake linkage means connecting the lower end of said bell crank with the brake shoes of the other set of car wheels on the opposite side of said car truck, and a tie rod connecting the two brake linkage means together across said car truck.

3. In a braking arrangement for railroad cars, a brake cylinder and an automatic double acting slack adjuster both located at one end of the car, said brake cylinder being supported horizontally on the base of said car and said slack adjuster being pivotally supported at its upper end on said car and perpendicular to said brake cylinders, a cylinder lever pivotally supported at its upper end at a point below the upper portion of said car and arranged generally in parallel relationship to said slack adjuster, said brake cylinder having its push rod pivotally connected to an intermediate point of said cylinder lever, a bell crank member pivotally supported on said car, one leg of said bell crank member being pivotally connected to the lower end of said slack adjuster, the lower end of said cylinder lever being connected with the brake linkage of the car wheels on one side of the car truck and the other leg of said bell crank member being connected with the brake linkage of the car wheels on the other side of the car truck, and a tie rod connecting the two brake linkages together across the car truck.

4. In a braking arrangement according to claim 3 in which the interconnecting brake linkage is serially connected between the brake cylinder and the slack adjuster whereby the full braking force of the brake cylinder is effective from one end of the brake linkage upon the intervening linkage and brake shoes on the car wheels on each side of the truck, and the slack adjuster is effective at the other end of the brake linkage to adjust for abnormal slack conditions in the brakes.

5. In the braking arrangement according to claim 3 in which the brake cylinder and the slack adjuster are connected to the opposite ends of the brake linkage, the interconnecting brake linkage being connected to the brake shoes of two sets of car wheels on opposite sides of the truck, whereby the full available force of the brake cylinder is applied directly to the car wheel brakes, while the adjustment for abnormal slack conditions and wear in the brakes and linkage is controlled by the slack adjuster at the end of the brake linkage after the full braking force has been effectively applied to the brakes.

6. In a braking arrangement for hopper cars, a brake cylinder and an automatic double acting slack adjuster both located below the sloped wall at one end of the hopper car, and spaced apart from each other on opposite sides of the car truck, said brake cylinder being supported horizontally on the base of the car and said slack adjuster being pivotally supported at its upper end from adjacent the sloped wall of the car and in a vertical position with respect to said brake cylinder, a cylinder lever pivotally supported at its upper end below the sloped wall of the car in a vertical position and substantially parallel to said slack adjuster, a push rod on said brake cylinder pivotally connected to an intermediate point on said cylinder lever, a bell crank member pivotally supported on the car frame and having one arm thereof pivotally connected to the lower end of said slack adjuster, the other arm of said bell crank being pivotally connected to one end of the brake linkage, the lower end of said cylinder lever being pivotally connected to the other end of the brake linkage, said brake linkage being operatively connected between said brake cylinder and slack adjuster whereby the full force of the brake cylinder is effective upon the car wheel brakes and the slack adjuster is effective to adjust for abnormal slack conditions after the full braking power has been applied to the brakes, and trigger linkage means operatively connecting said cylinder lever with said slack adjuster for controlling the actuation of said slack adjuster.

7. The braking arrangement as claimed in claim 6 in which the trigger linkage means includes an actuator rod extending across the car truck between the slack adjuster and the brake cylinder and pivoted at each end to the car frame, and said actuator rod having a lever arm pivotally connected to said slack adjuster for control of the same after predetermined movement of the brake cyclinder push rod, and another lever arm pivotally connected to said cylinder lever, said lever arms rigidly connected to said actuator rod and located adjacent said slack adjuster and brake cylinder respectively.

8. The braking arrangement as claimed in claim 6, in which the trigger linkage means includes an actuator rod pivotally supported on the car frame and having two separate lever arms rigidly connected on each end thereon, pivoted adjustable linkage means connecting one of said lever arms with said slack adjuster, other pivoted linkage means connecting the other of said lever arms with said cylinder lever for limited movement therewith whereby the action of said slack adjuster is controlled after a predetermined movement of said cylinder lever by said brake cylinder.

9. In a braking arrangement for hopper cars having a sloped wall on each end thereof, a brake cylinder and a slack adjuster located at each end of the car for controlling the brake equipment on the individual truck at each car end, said brake cylinder being horizontally supported on the car frame, said slack adjuster being pivotally supported from adjacent the slopped car wall and in a vertical position with respect to said brake cylinder, a cylinder lever pivotally supported below the sloped car wall in a vertical position and substantially parallel to said slack adjuster, said cylinder lever and said slack adjuster being disposed on opposite sides of the center sill of said car frame and the car truck, said brake cylinder having a pivoted connection with an intermediate point of said cylinder lever, a bell crank pivotally supported on said car frame and having a pivotal connection with the lower end of said slack adjuster, separate brake linkage for each set of wheels on opposite sides of said car truck, a dead lever pivoted to the car frame, and a pivotal connection from the lower end of said cylinder lever with said dead lever, one set of brake linkage connected to said dead lever, and a pivotal connection from said bell crank with the other set of brake linkage whereby the full braking power from said brake cylinder is effective directly through both sets of brake linkages including said dead lever upon the brake shoes of both car wheels from one end of the brake linkage, while the control of abnormal slack conditions by said slack adjuster is effected at the other end of the brake linkage.

10. In a braking arrangement for hopper cars according to claim 9 in which there is a trigger arrangement between the slack adjuster and the cylinder lever for controlling the action of the slack adjuster, said trigger arrangement including an actuator rod extending between said slack adjuster and said cylinder lever, a first lever arm secured at one end to said actuator rod adjacent said slack adjuster, a second lever arm secured to the other end of said actuator rod adjacent said cylinder lever, pivoted linkage means connecting said first lever arm with said slack adjuster, and other pivoted linkage means connecting said second lever arm with said cylinder lever.

11. In a braking arrangement for hopper cars according to claim 9 in which there is a trigger arrangement between the slack adjuster and the cylinder lever for controlling the action of said slack adjuster after a predetermined movement of said cylinder lever, said trigger arrangement including an actuator rod extending between said slack adjuster and said cylinder lever and supported for rotary movement at each end on the car frame, a first lever arm rigidly supported at one end to said actuator rod adjacent said slack adjuster, a second lever arm spaced apart from said first lever arm and rigidly supported at one end to said actuator rod adjacent said cylinder lever, adjustable linkage means pivotally connecting said first lever arm with said slack adjuster, and other linkage means pivotally connecting said second lever arm with said cylinder lever for actuation thereby after a predetermined movement of said cylinder lever by said brake cylinder.

12. In a braking arrangement for cars, a brake cylinder and an automatic double-acting slack adjuster, the brake cylinder being supported on the car and the slack adjuster being pivotally supported from the car and in a generally vertical position with respect to the brake cylinder, a cylinder lever pivotally supported on the car and substantially parallel to said slack adjuster, a push rod on said brake cylinder pivotally connected to an intermediate point on said cylinder lever, and an actuating connection between the cylinder lever and the slack adjuster, a brake linkage being operatively connected between the brake cylinder and slack adjuster, this interconnecting brake linkage being connected to the brake shoes of car wheels on opposite sides of a truck, whereby the full available force of the brake cylinder is applied directly to the car wheel brakes, while the adjustment for abnormal slack conditions and wear in the brakes and linkage is controlled by the slack adjuster at the end of the brake linkage after the full braking force has been effectively applied to the brakes.

13. In a braking arrangement for railroad cars, a braking assembly which includes a horizontally mounted brake cylinder and an automatic double acting slack adjuster, the brake cylinder and the slack adjuster being arranged generally perpendicularly to one another, the slack adjuster being pivoted to the car with its lower end extending downwardly adjacent the base of the car, a cylinder lever pivoted at its upper end to the car and extending downwardly generally parallel to the slack adjuster, and below the base of the car, said brake cylinder having a piston rod pivotally connected to an intermediate position on said cylinder lever, an actuating connection from the cylinder lever to the slack adjuster, which includes a link extending from the cylinder lever, a rocking assembly pivoted on the car and an adjusting member positioned to be actuated by the rocking assembly and connected to the slack adjuster, and a brake linkage extending between the cylinder lever and the slack adjuster.

14. The structure of claim 13 characterized in that the adjusting member extends parallel with and is mounted to move in parallel with the slack adjuster.

References Cited

UNITED STATES PATENTS

| 3,372,779 | 3/1968 | Roselius et al. | 188—197 X |
| 3,386,539 | 6/1968 | Macku et al. | 188—197 X |

DUANE A. REGER, *Primary Examiner.*

U.S. Cl. X.R.

188—52